US006934956B1

(12) United States Patent
Allen

(10) Patent No.: US 6,934,956 B1
(45) Date of Patent: Aug. 23, 2005

(54) METHOD AND APPARATUS FOR INSTALLING AN OPERATING SYSTEM

(75) Inventor: Duane Le Allen, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 08/925,703

(22) Filed: Sep. 9, 1997

(51) Int. Cl.$^7$ .......................... G06F 3/00; G06F 9/44; G06F 9/46; G06F 13/00
(52) U.S. Cl. ......................... 719/327; 717/175; 713/1
(58) Field of Search ............................. 395/651, 652, 395/712, 500, 828; 713/1–2, 100; 717/11, 717/168–178; 709/100, 327; 710/8–14, 62; 718/100; 719/320–321, 327

(56) References Cited

U.S. PATENT DOCUMENTS

| | | | | |
|---|---|---|---|---|
| 5,613,125 A | * | 3/1997 | Nguyen et al. | 395/651 |
| 5,640,562 A | * | 6/1997 | Wold et al. | 395/652 |
| 5,713,009 A | * | 1/1998 | DeRosa, Jr. et al. | 395/500 |
| 5,717,930 A | * | 2/1998 | Imai et al. | 395/712 |
| 5,748,980 A | * | 5/1998 | Lipe et al. | 710/8 |
| 5,794,032 A | * | 8/1998 | Leyda | 395/652 |
| 5,794,052 A | * | 8/1998 | Harding | 395/712 |
| 6,094,531 A | * | 7/2000 | Allison et al. | 395/712 |

OTHER PUBLICATIONS

Microsoft News Letter: Microsoft Releases Windows 95 Service Pack, Feb. 14, 1996.*

* cited by examiner

Primary Examiner—Meng-Al T. An
Assistant Examiner—G. L. Opie
(74) Attorney, Agent, or Firm—Trop, Pruner & Hu, P.C.

(57) ABSTRACT

The invention in one embodiment is a method for installing an operating system on a computer. The method includes generating an external configuration file containing information about a plurality of devices that might be associated with the computer; identifying a particular device associated with the computer, the particular device being one of the plurality of devices; installing a driver on the computer according to the information stored in the external configuration file and the particular device's identity; and installing the operating system according to information stored in the external configuration file and the particular device's identity.

16 Claims, 13 Drawing Sheets

METHOD AND APPARATUS FOR INSTALLING AN OPERATING SYSTEM

BACKGROUND OF THE INVENTION

1. Field of the Invention

This invention pertains to operating systems generally and, more particularly, a method and apparatus for installing an operating system.

2. Description of the Related Art

Personal computers are assembled from a number of discrete components known as "devices." The central processing unit ("CPU"), monitor, keyboard, and memory, for instance, are commonly recognized devices used in desktop computers. These parts are integrated more closely in other types of personal computers, such as laptop and hand-held computers, to meet size and weight constraints. Still, these discrete parts can be separately identified. In recent years, however, it has become standard for personal computers to include "add-on" devices. A new personal computer might therefore further include a modem, a mouse, and an optical disk ("CD-ROM") drive and may also be connected to a printer.

Each of these devices consumes some part of the computer's system resources. Exemplary resources include input/output ("I/O") address spaces, interrupts, direct memory access ("DMA") channels, and memory space. System resources therefore have to be allocated to each device. Historically, this was done by setting dual, in-line package ("DIP") switches or jumpers on the hardware interface that hardwired these allocations. This is sometimes called "configuring" the system.

Once the system resources were allocated, the computer interfaced with these devices at the software level through software packages known as "drivers." A driver contains information needed to send output to and/or receive input from the device. Thus, for example, when a computer sends a print job to the printer, the computer could do so through the printer driver using the correct parameters. Each driver typically is unique. The drivers must therefore be changed whenever the system is reconfigured. If a new device is installed or if a device is moved to a new address location, then a new driver must be installed and, if an obsolete driver exits, the old one must be deleted.

A new approach called "plug and play" ("PnP") was eventually developed. A plug and play system permits a user to "plug in" a new device and "play" it without having to manually reconfigure the computer system. Instead, software examines the hardware and dynamically allocates system resources according to each device's needs. Typically, the information for each device is stored in a configuration file along with many types of devices that potentially may be associated with the computer system either by installation or connection. The software locates each device, identifies the device, determines the device's needs from the configuration file and the device's identity, and then allocates the system resources. The software then also typically installs whatever drivers the device needs according to the information in the configuration file.

The plug and play dynamic allocation can be performed by an operating system ("OS"). An operating system is a software package through which the user and the computer interface. Not all operating systems have plug and play capabilities. Exemplary plug and play operating systems include Windows® 95 and Windows® NT.

The operating system must at some point be installed on the personal computer. Typically, the OS is installed by the manufacturer of the personal computer before shipping or by the user after reconfiguring the system. Installation is generally performed using installation software provided on a CD-ROM under license by the owner of the operating system. The installation software for a plug and play operating system includes a configuration file for installing the drivers for devices that potentially might be associated with the computer. The operating system must be installed on the computer using installation software and it is during installation that the operating system dynamically allocates system resources and installs device drivers.

Plug and play operating systems are, however, fraught with many problems. For instance, the configuration file frequently has no information for new devices first marketed after the operating system is released. Also, plug and play operating systems frequently mistake a device for a device of another type. The operating system in these situations installs the wrong driver or fails to install any driver at all. Either way, the computer's full capabilities cannot be exercised until the errors are corrected. These problems are compounded in that OS installation software is typically provided to the installer on a CD-ROM, making updates and corrections to the installation software virtually impossible. Plug and play capabilities have consequently failed to realize their full potential.

The present invention is directed to overcoming, or at least reducing the effects of, one or more of the problems set forth above.

SUMMARY OF THE INVENTION

One embodiment of the invention is a method for installing an operating system on a computer. The method includes generating an external configuration file containing information about a plurality of devices that might be associated with the computer; identifying a particular device associated with the computer, the particular device being one of the plurality of devices; installing a driver on the computer according to the information stored in the external configuration file and the particular device's identity; and installing the operating system according to information stored in the external configuration file and the particular device's identity.

BRIEF DESCRIPTION OF THE DRAWINGS

Other objects and advantages of the invention will become apparent upon reading the following detailed description and upon reference to the drawings in which.

Figure 1:
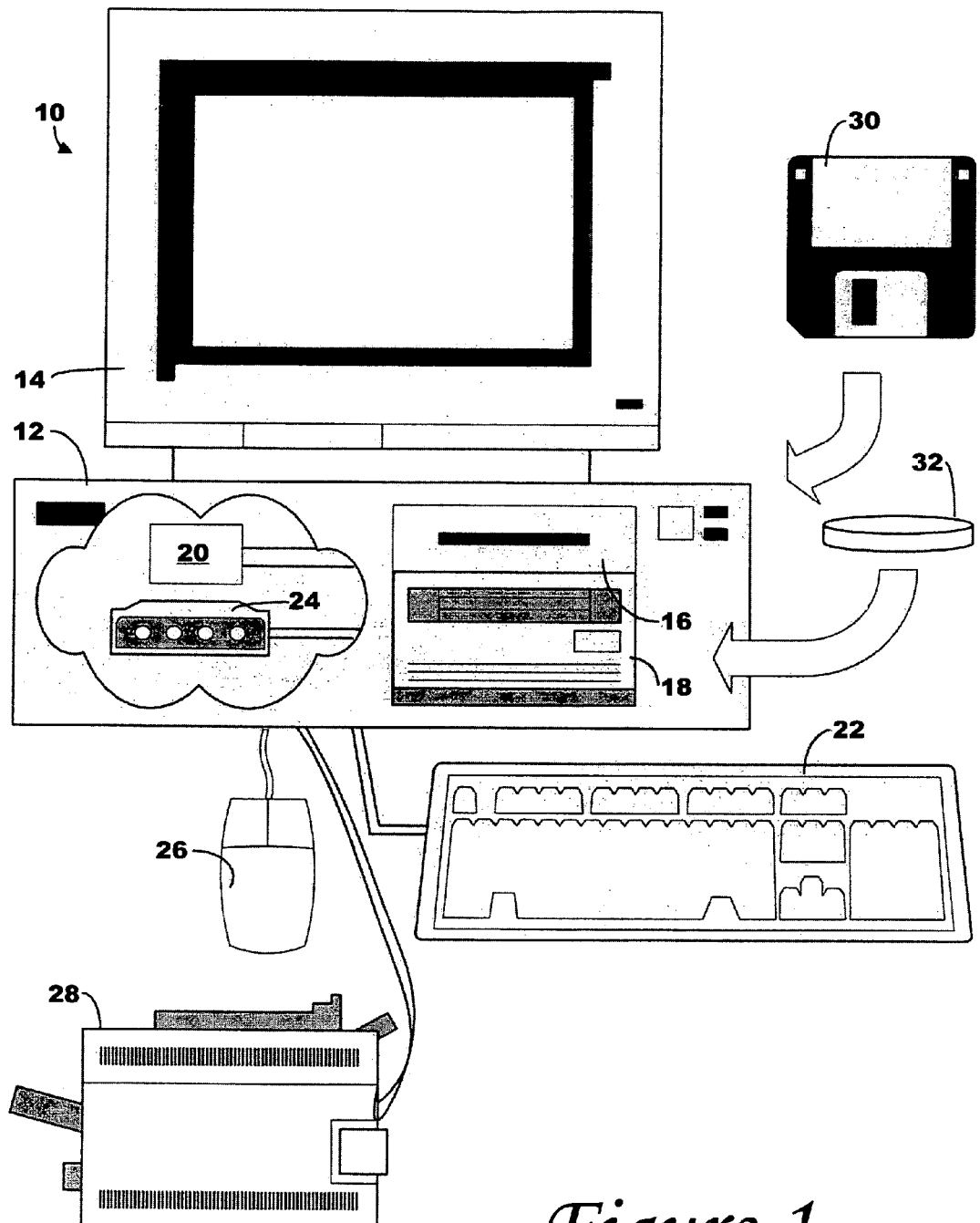
FIG. 1 illustrates a personal computer system upon which the invention in one embodiment may be practiced.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

An Apparatus for Practicing the Invention

FIG. 1 illustrates a computer system 10 upon which the invention in one embodiment may be practiced. A personal computer 12 includes a monitor 14, a floppy disk drive 16, an optical disk drive 18, a hard disk drive 20, and a keyboard 22. The computer 12 illustrated is a desktop computer manufactured by Micron Electronics, Inc. of Nampa, Id. However, the invention is not so limited as computers by other manufacturers and other types of personal computers, such as laptop and hand-held computers, might also be employed.

The computer 12 of FIG. 1 also includes several add-on devices. More particularly, computer 12 is connected to a modem 24, a mouse 26, and a laser printer 28. The computer system 10 might, in other embodiments, omit such add-on devices or employ still other add-on devices, those illustrated merely being exemplary of add-on devices generally considered standard. There may be many variations on this theme. For instance, the modem 24 is shown internal to computer 12, but in other embodiments may be external. Also, the printer 28 may be a type of printer other than a laser printer and may even be some other form of input/output ("I/O") device such as a plotter or magnetic tape drive.

As will be recognized by those in the art, many of the components and add-on devices will require drivers to communicate with the processor of the computer 12. As used hereinafter, the term "device" shall refer to any such add-on device or component needing such a driver. A device shall also be referred to as being "associated" with the computer 12 to encompass the myriad ways in which devices may interface at the hardware level with the computer 12 and its processor.

Some portions of the detailed descriptions below are presented in terms of software implemented methods, algorithms, and/or symbolic representations of operations on data bits within a computer memory. These descriptions and representations are the means used by those skilled in the art to most effectively convey the substance of their work to others skilled in the art. A software implemented method, and/or algorithm is here, and generally, conceived to be a self-consistent sequence of acts leading to a desired result. The acts require at some level physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, all of these and similar terms are to be associated with the appropriate physical quantities and are merely convenient labels applied to these quantities. Unless specifically stated or as may otherwise be apparent from the above discussions, terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A First Embodiment of the Invention

Figure 2:
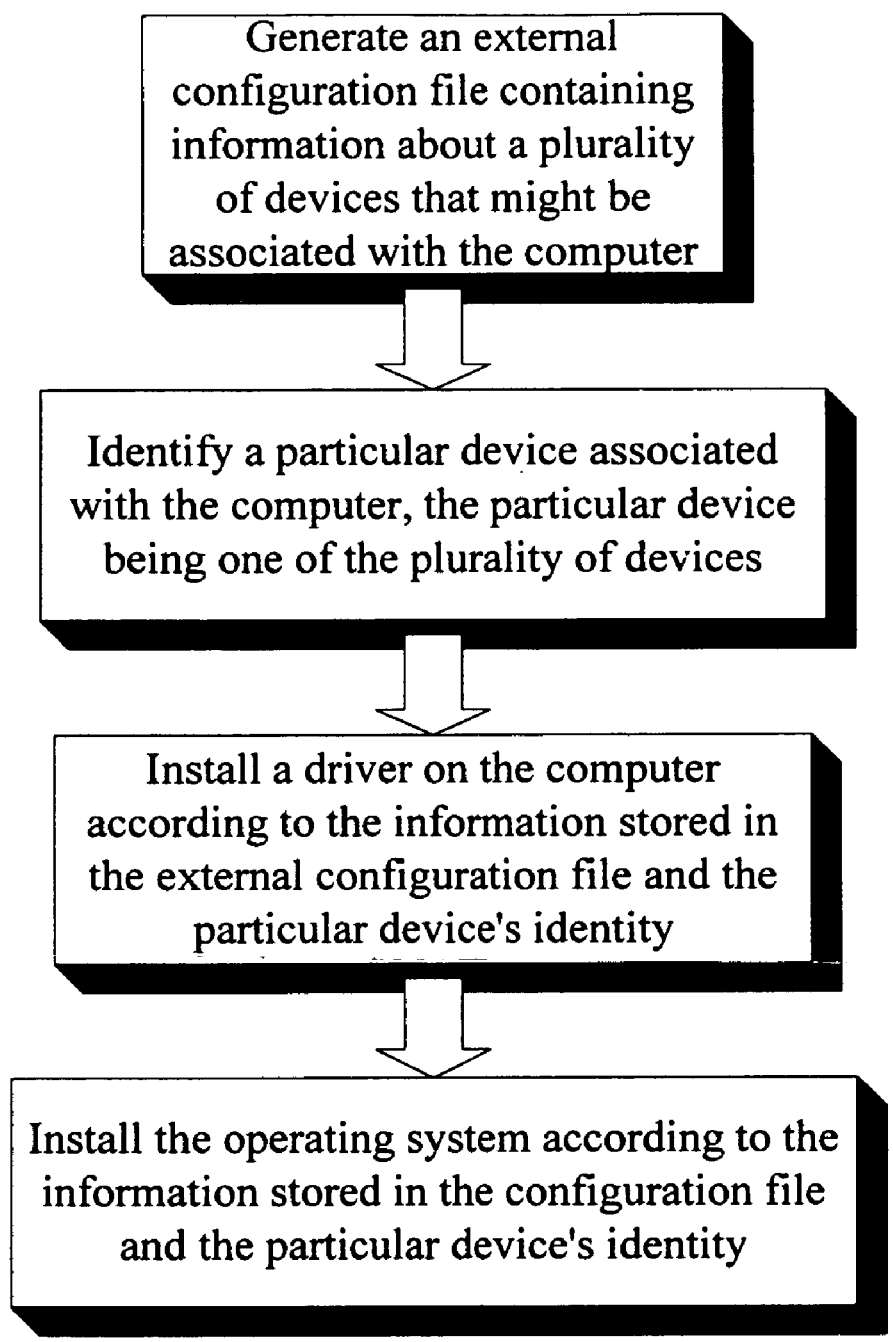
FIG. 2 is illustrates one embodiment of the method of the invention.

FIG. 2 illustrates a method for installing an operating system on a computer such as computer 12. As mentioned above, an operating system must be installed for a user to interface with the computer. In turn, drivers must be installed for the computer 12 to communicate with each device. Thus, a computer is programmed with an operating system and drivers are typically installed with the operating system.

The method of FIG. 2 begins by generating an external configuration file containing information about a plurality of devices that might be associated with the computer 12. The plurality of devices will typically include those interfacing with the computer 12 through a variety of protocols such as industry standard architecture ("ISA"), peripheral component interconnect ("PCI"), small computer serial interface ("SCSI"), and integrated drive electronics ("IDE") protocols. Also, the plurality of devices may include all manner of types, such as monitors, sound cards, and modems from a variety of manufacturers. Although the external configuration file need not necessarily be so implemented, it may be conceptualized as a lengthy list of devices and associated information regarding their manufacturer, their type, and the protocol they employ.

As mentioned above, the OS installation software also contains a configuration file, which shall be referred to as an "internal" configuration file. The term "external" is used here to distinguish the configuration file of the invention from the internal configuration file of the OS installation software. The external configuration file is generated in much the same way as the internal configuration file as will be recognized by those in the art having the benefit of this disclosure. However, because the external configuration file is not part of the OS installation software, it can be frequently updated or modified as new devices are released or errors are identified in the internal configuration file.

The method proceeds by next identifying a particular device associated with the computer, the particular device being one of the plurality of devices set forth in the external configuration file. This identification may be either automated or manual. If manual, the installer might be queried as to the identity of the various devices, which might introduce human error into the installation process. Because the external configuration file can be readily updated, it is envisioned that a device not included in the external configuration file will rarely be encountered, although this is possible.

The method next proceeds by installing a driver for the device and the operating system on the computer according to the information stored in the external configuration file and the particular device's identity. This may be done either by replacing erroneous drivers installed by the OS installation software, replacing the erroneous drivers to be installed by the OS software so that the OS installation software will install the correct drivers, or by patching the drivers installed by the OS installation software to correct the errors they contain. Thus, driver installation may be performed prior to, contemporaneous with, or after installing the operating system. The embodiment of FIG. 2 is finished once the OS is fully installed. However, in alternative embodiments, additional tasks may be performed if desired. For instance, various type of applications software might be loaded.

A Second Embodiment of the Invention

Figure 3:
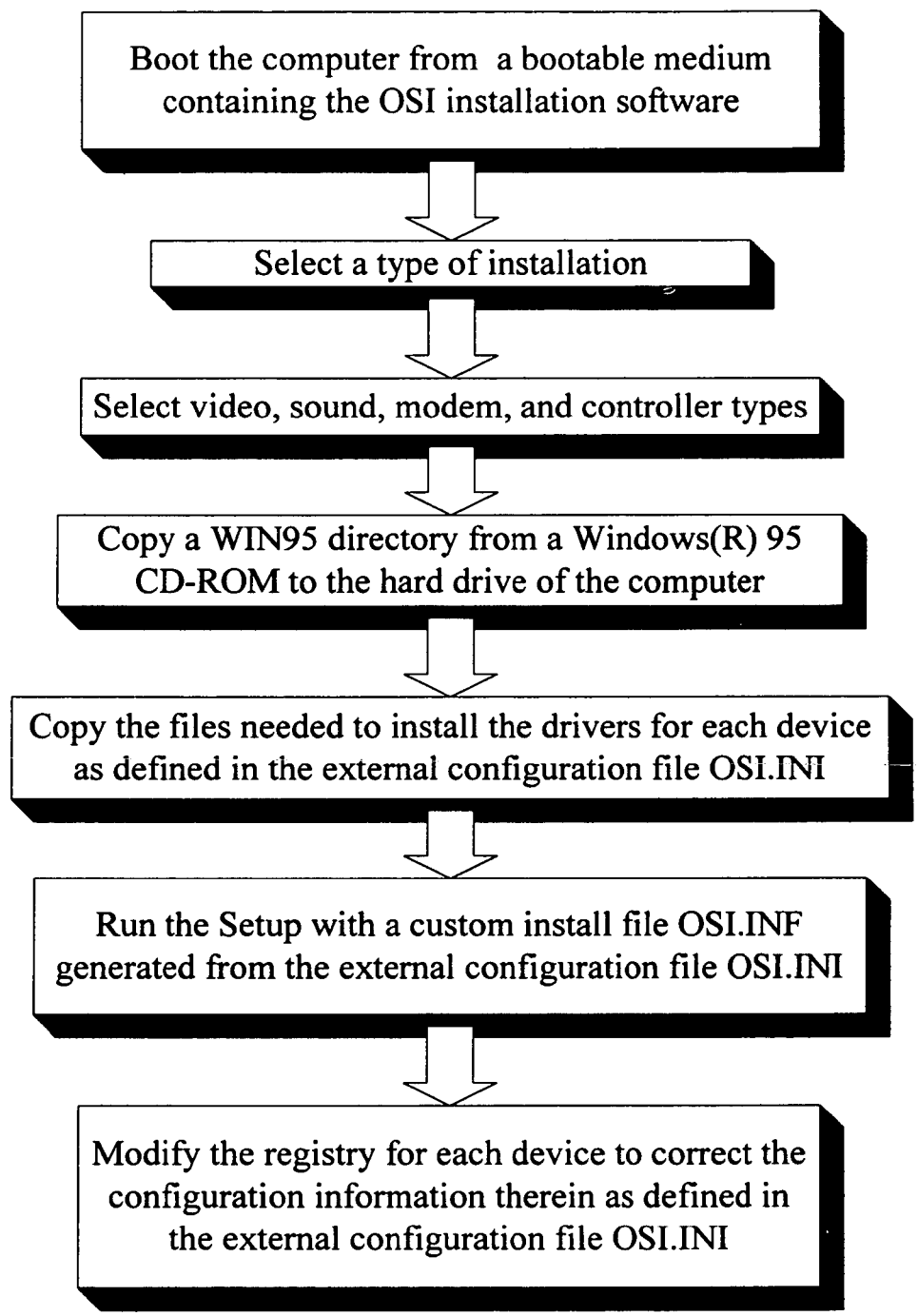
FIG. 3 illustrates one particular variation of the embodiment in FIG. 2.

FIGS. 3 and 4A–4C illustrate one particular variation of the embodiment in FIG. 2. Referring now to FIG. 3, this embodiment involves:
(a) booting the computer 12 from a CD-ROM boot disk containing the software embodying the present invention;
(b) selecting a type of installation;
(c) selecting video sound, modem, and controller types;
(d) copying a WIN95 directory from a Windows® 95 compact disk to the hard drive 20 of the computer 12;
(e) copying the files needed to install the drivers for each device as defined in the external configuration file OSI.INI;
(f) running the setup with a custom install file OSI.INF generated from the external configuration file OSI.INI; and
(g) modifying the registry for each device to correct the configuration information therein as defined in the external configuration file OSI.INI.

Figure 4A:
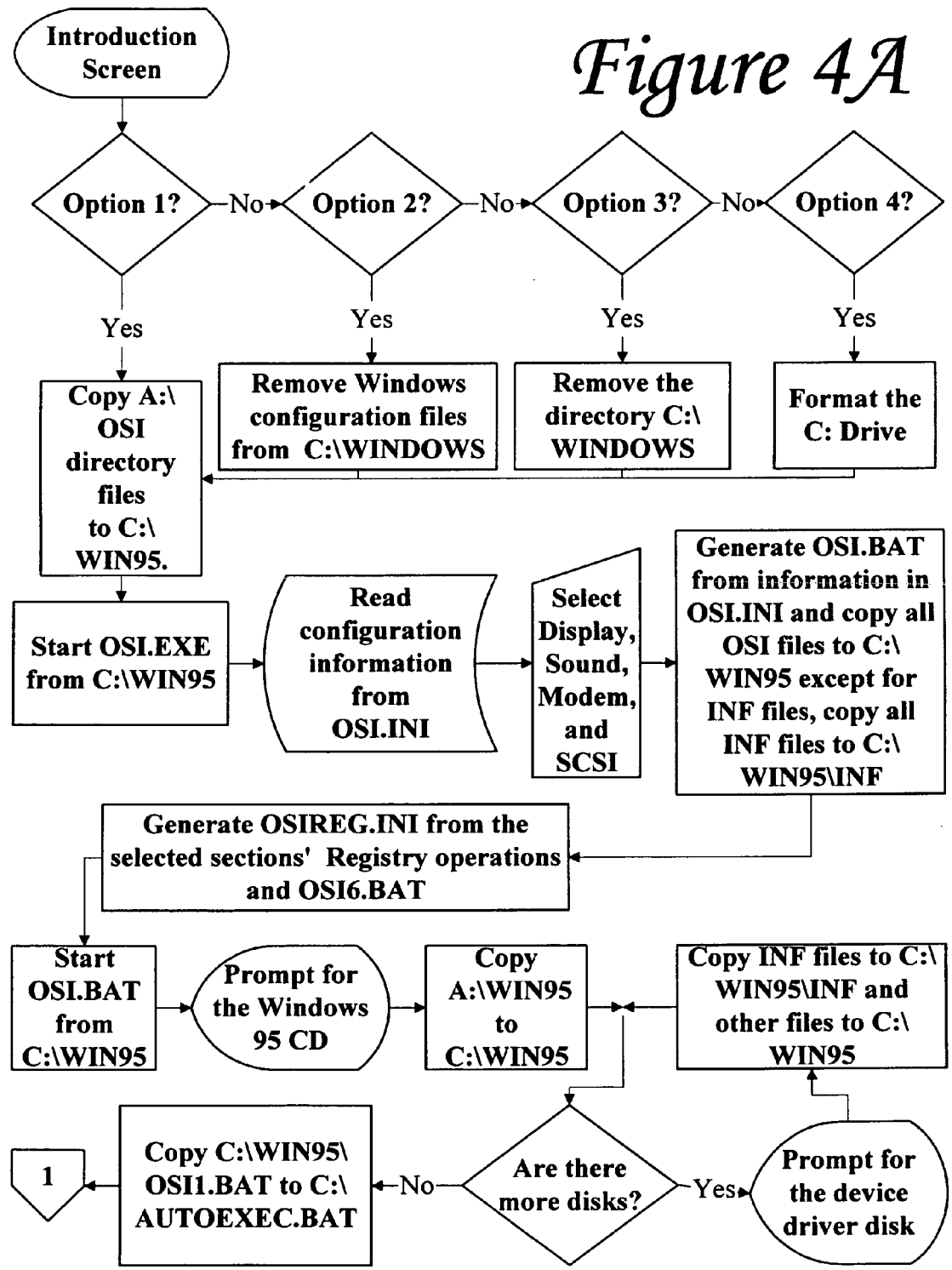
FIGS. 4A–4C detail the embodiment in FIG. 3.
Figure 4B:
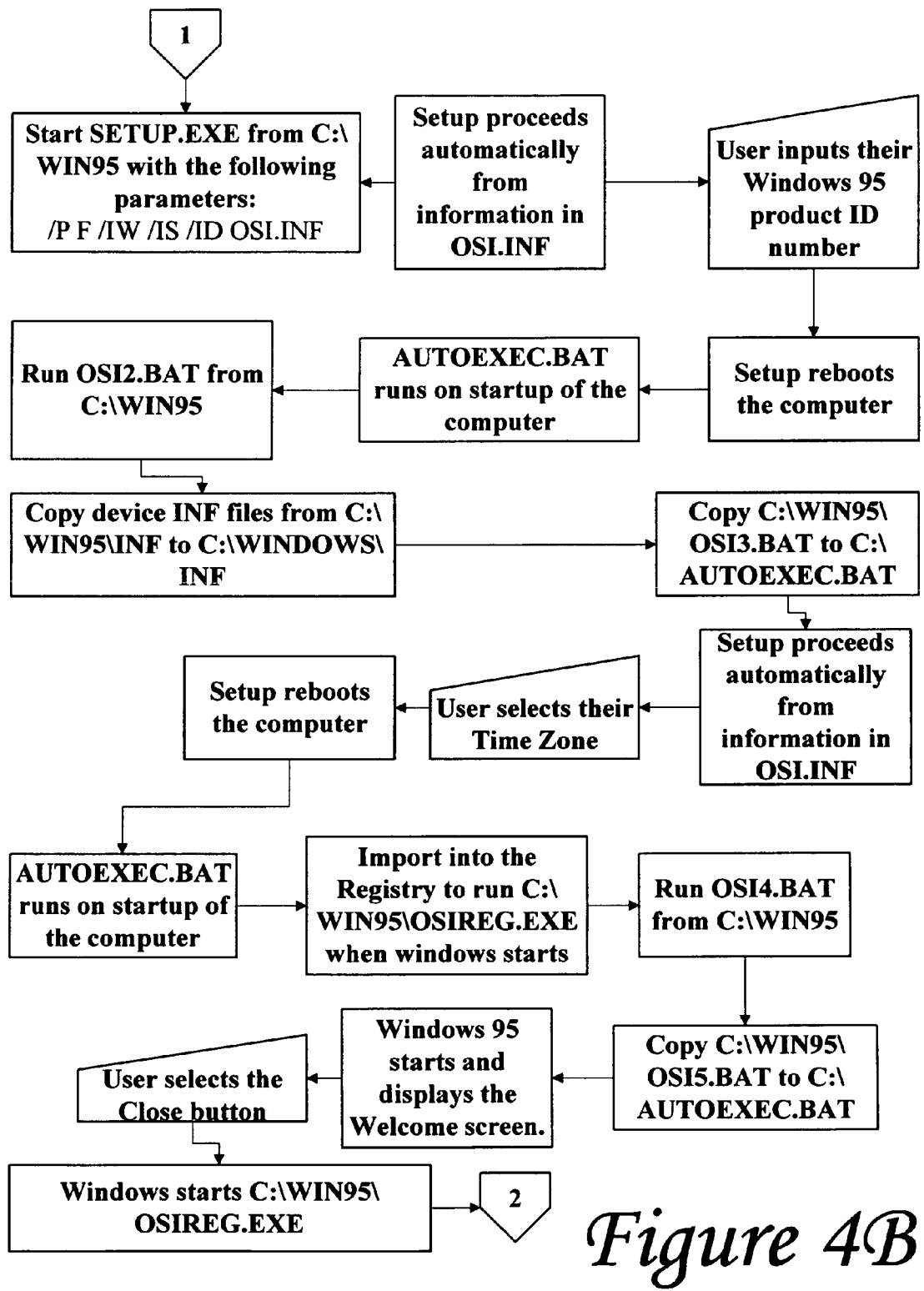
Figure 4C:
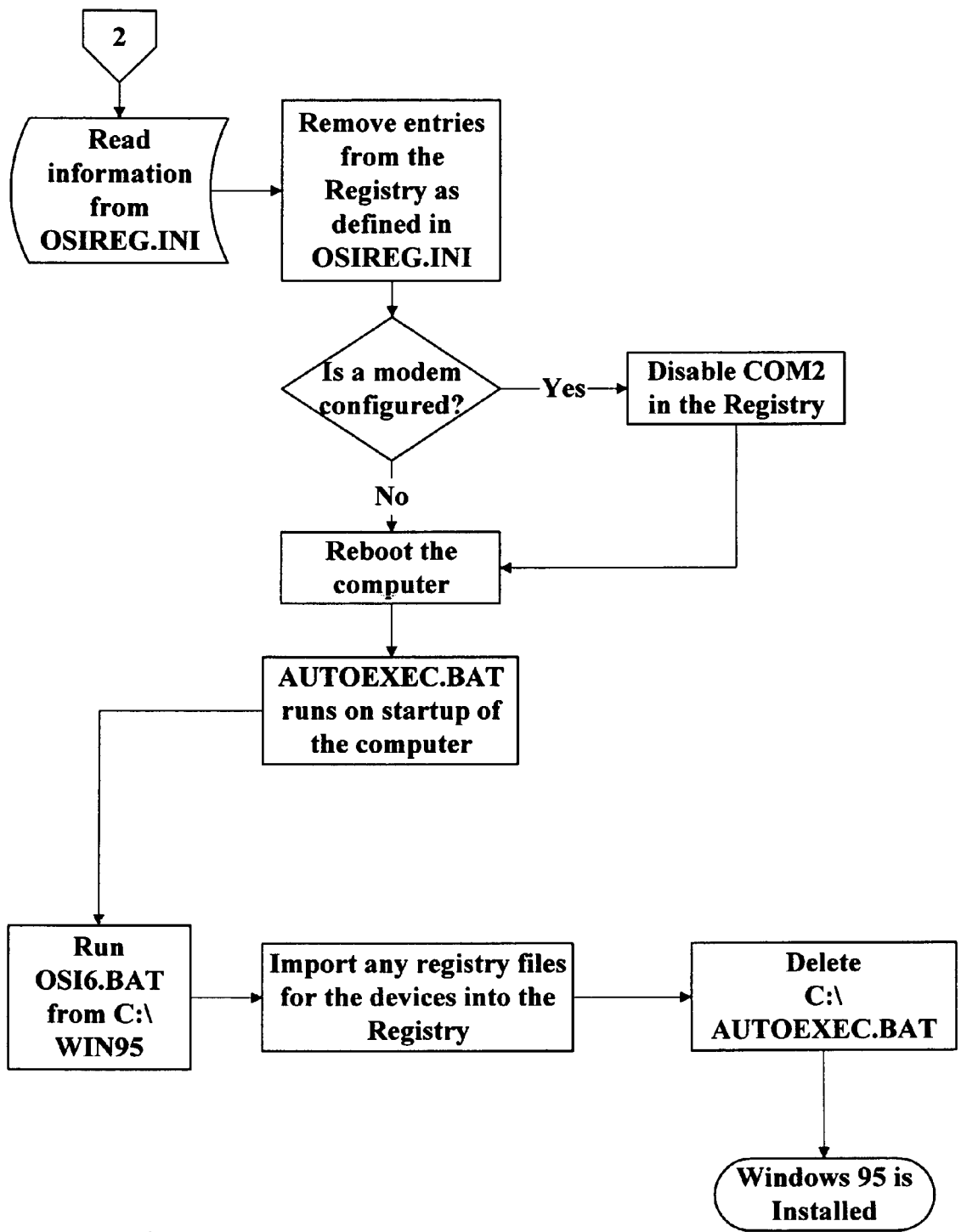

FIGS. 4A–4C and the discussion below flesh out this process.

In this particular embodiment, the computer 12 is a desktop personal computer such as is commercially available from Micron Electronics, Inc., of Nampa, Id., and the operating system is Windows® 95 available from Microsoft Corporation of Seattle, Wash. The instructions for performing the method in this particular embodiment are encoded on a removable, portable program storage medium such as floppy diskette 30 in FIG. 1 inserted into the floppy disk drive 16 or a CD-ROM optical disk such as disk 32 inserted into the optical disk drive 18. Note that these instructions may be obtained already encoded on the program storage medium or, in some embodiments, downloaded to the same from the World Wide Web.

This particular embodiment also employs a form-type, graphical user interface frequently called a "wizard" to interface with the installer. While the interaction between with the installer is reflected in FIGS. 4A–4C, references to such activities are sometimes omitted from the following discussion for the sake of clarity and brevity. Accordingly, while perhaps preferable in some embodiments, the use of a wizard is not necessary to the practice of the invention. Some embodiments may actually be entirely automated and thus eliminate the need for intermediate installer interaction.

Referring now to FIG. 4A, the computer 12 in this particular embodiment first presents an introduction screen to the installer requesting the selection of one of four installation options. The four options in this particular embodiment are: (1) install Windows® 95 while keeping the existing configuration; (2) install Windows® 95 keeping the existing internal configuration files only, (3) install Windows® 95 after removing all EXISTING Windows® files; and (4) install Windows® 95 after formatting the hard disk 20. Options (2)–(4) require intermediate preparation. Depending on whether options (2)–(4) are selected, the computer: removes the internal configuration files previously installed in C:\WINDOWS; removes all the Windows® 95 files, including the internal configuration file, and then deletes the C:\WINDOWS directory; or formats the hard disk, respectively. As will be known to the art, Windows® configuration files end with the extension .INI, such that the configuration files can be readily deleted by deleting C:\WINDOWS\*.INI.

If option (1) is selected and, if options (2)–(4) are selected, after any intermediate preparation, the computer 12 copies all necessary files from the D:\OSI directory of the portable program storage medium to a newly created C:\WIN95 directory on the hard disk 20. "Necessary files" in this case are those files of all types necessary to install Windows® 95. The computer 12 then reads the configuration information from the external configuration file C:\WIN95\OSI.INI containing the configuration information for Windows® 95. Note that OSI.INI is stored in C:\WIN95 at this point. The computer 12 then prompts the installer to select the display, sound, modem, and SCSI device type. This may be done by asking the installer to select from a list of presented options or the installer may simply enter the information when prompted.

Utilizing the information from the external configuration file OSI.INI and from the device selection, the computer 12 then generates two temporary batch files (OSI1.BAT and OSI6.BAT) and a registry file (OSIREG.INI) as set forth in FIG. 4A. The registry file (OSIREG.INI) will subsequently be used to write correct configuration information to the registry file for the Windows® 95 operating system. Four other temporary batch files (OSI2.BAT, OSI3.BAT, OSI4.BAT, and OSI5.BAT), whose functions are later discussed, are previously generated and stored on the portable program storage medium (not shown). Batch files are simply files containing a series of commands for a computer to execute. Thus, the contents of the temporary batch files will depend on their functions disclosed below and may vary depending on the particular embodiment implemented. The computer 12 then begins installing the operating system.

The computer 12 starts the installation by executing the first temporary batch file OSI1.BAT. The Windows® 95 files are copied from the CD-ROM installation disk(s) to the C:\WIN95 directory on the hard disk 20. Next, the drivers for each device are copied from a respective installation disk to a C:\WIN95\INF subdirectory on the hard disk 20. When the Windows® 95 files and device drivers have been completely copied, the first temporary batch file is copied over the AUTOEXEC.BAT file on the hard disk 20 and renamed AUTOEXEC.BAT. The AUTOEXEC.BAT file is the first file executed by the computer 12 when it is turned on or rebooted. Thus, the next time the computer 12 is booted, it will execute the first temporary batch file OSI1.BAT.

The computer 12 then begins the Windows® setup using the parameters that force hardware detection, bypass the license screen, bypass ScanDisk, bypass the disk space check. OSI.INF is specified as the information setup file for the setup. The information setup file contains some of the information necessary to install the driver for each device previously selected. Such information includes the memory location reserved for the device and any necessary registry changes. The installer inputs the appropriate Windows® 95 product identification number and the computer is rebooted.

Upon reboot, the computer 12 executes AUTOEXEC.BAT as it always does, and thus executes the first temporary batch file (OSI1.BAT) that was generated earlier and copied over the original AUTOEXEC.BAT.

The AUTOEXEC.BAT then calls the second temporary batch file (OSI2.BAT) from the C:\WIN95 directory of the hard disk 20 and executes it. OSI2.BAT copies the information files (*.INF) from the C:\WIN95\INF subdirectory to the C:\WINDOWS\INF subdirectory. After copying, the C:\WINDOWS\INF subdirectory provides the information needed by Windows® 95 to install the newer drivers Windows® 95 otherwise would omit or install erroneously. OSI2.BAT then copies the third temporary batch file (OSI3.BAT) to AUTOEXEC.BAT and setup proceeds automatically from the information in OSI.INF. Then, the installer selects their time zone and Setup reboots the computer 12.

On reboot, the computer 12 executes AUTOEXEC.BAT, which is now what formerly was the third temporary batch file OSI3.BAT. AUTOEXEC.BAT imports the correct information into the registry to run when Windows® 95 starts. AUTOEXEC.BAT then runs the fourth temporary batch file (OSI4.BAT) from the C:\WIN95 directory, which copies the fifth temporary batch file (OSI5.BAT) over AUTOEXEC-.BAT. OSI4.BAT then proceeds by starting Windows® 95 by starting OSIREG.EXE in the C:\WIN95 directory. OSIREG.EXE then reads the necessary information from OSIREG.INI, removes erroneous entries in the registry as defined by OSIREG.INI. If an internal modem is configured, the external COM2 I/O port is disabled in the registry. The computer 12 is then rebooted.

On reboot, AUTOEXEC.BAT, which was formerly OSI5.BAT, begins running by calling the sixth temporary batch file (OSI6.BAT). OSI6.BAT then imports any registry files for the devices into the registry to fix any errors in the way Windows® 95 detected new devices in the error. This fix is known as a "patch." OSI6.BAT then deleted AUTOEXEC.BAT and Windows® 95 is installed, If the installer selected option 4, then installation of applications programs can proceed in the manner known to the art.

A Third Embodiment of the Invention

Figure 5:
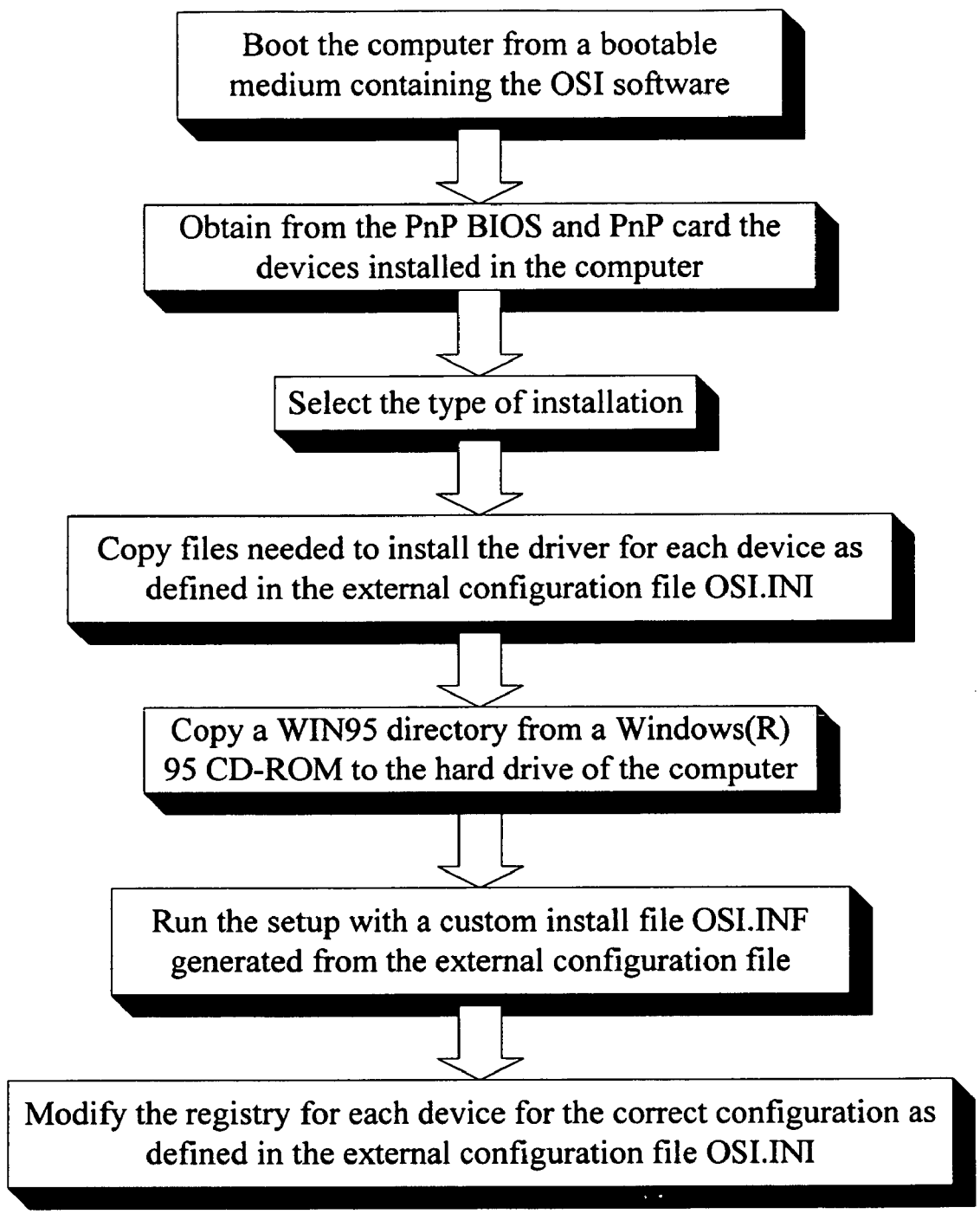
FIG. 5 illustrated one particular variation of the embodiment in FIG. 2 alternative to that in FIGS. 3 and 4A–4C.

FIGS. 5 and 6A–6H illustrate one particular variation of the embodiment in FIG. 2 alternative to that in FIGS. 4A–4C. Referring to FIG. 5, generally, this particular embodiment comprises:
 (a) booting the computer 12 from a bootable medium such as a CD-ROM boot disk or a Micron Customer Resource Center ("MCRC") CD-ROM boot disk;
 (b) obtaining from the PnP BIOS and PnP cards the devices installed in the computer 12;
 (c) selecting a type of installation;
 (d) copying files needed to install the driver for each device as defined in the external configuration file OSI.INI;
 (e) copying a WIN95 directory from a Windows® 95 CD to the hard drive 20 of the computer 12;
 (f) running Setup with a custom install file OSI.INF generated from the external configuration file; and
 (g) modifying the registry for each device for the correct configuration as defined in the external configuration file OSI.INI.

FIGS. 6A–6G and the discussion below flesh out this particular embodiment.

Figure 6A:
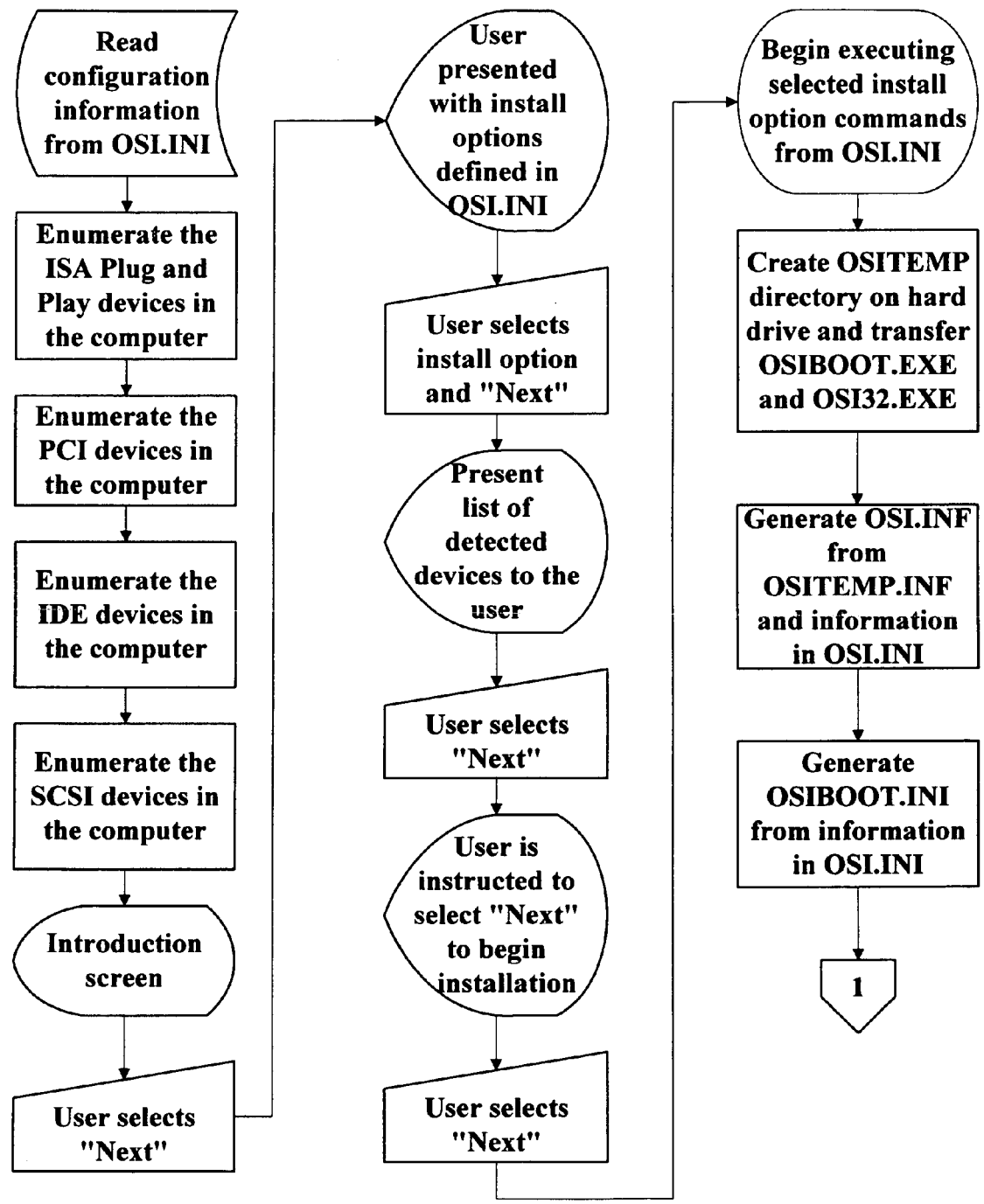
FIGS. 6A–6H detail the embodiment of FIG. 5.

As shown in FIG. 6A, this particular embodiment begins by reading configuration information from the external configuration file OSI.INI. The computer 12 operating in accordance with the installation software of the present invention then enumerates the devices for which system resources must be dynamically allocated. This particular embodiment enumerates devices operating in accordance with numerous protocols such as ISA, PCI, IDE, and SCSI. These protocols are presented in FIG. 6A in a particular order, but the invention is not so limited. Likewise, the invention is not limited to particular types of protocol employed by various devices as shown in this particular embodiment. FIGS. 6B–6E detail the enumeration of the devices.

Figure 6B:
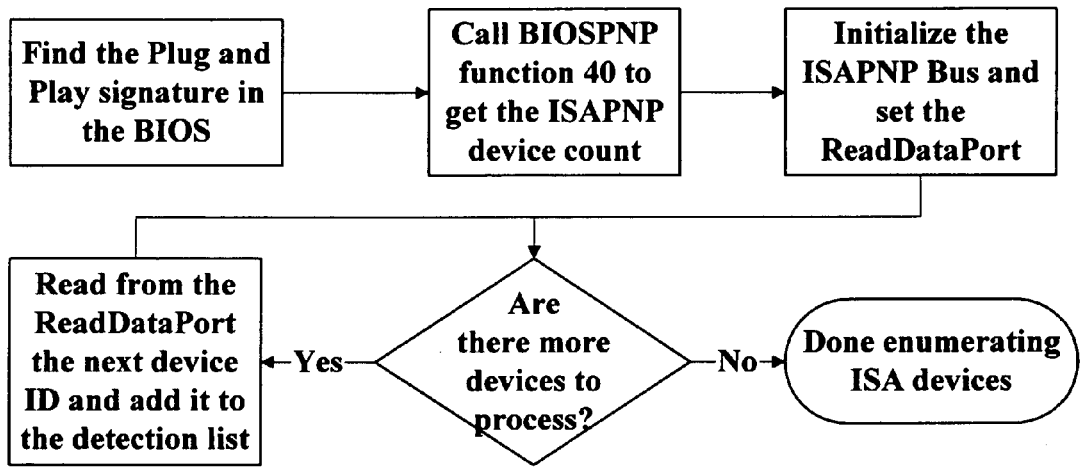

As shown in FIG. 6B, the computer 12 enumerates ISA plug and play devices by first finding the plug and play signatures in the basic input/output system ("BIOS"), which includes:
 (a) scanning the BIOS segment 0F:0000 for $PnP;
 (b) getting the PnP BIOS Entry Point from the structure at an offset of 13 bytes; and
 (c) getting the BIOS Data segment from the structure at an offset of 27 bytes.

The computer 12 then calls the BIOS PnP function 40 to get the ISA PnP device count by:
 (a) pushing the BIOS Data segment, a pointer to a memory location and 40H, onto a stack;
 (b) calling the PnP BIOS Entry Point;
 (c) getting the ISA PnP card count from the structure at an offset of 1 byte; and
 (d) getting the ReadDataPort address from the structure at an offset of 2 bytes.

The computer 12 next initializes the ISA PnP bus and sets the ReadDataPort by:
 (a) initializing the ISA PnP bus by sending the following sequences of bytes in hexadecimal representation to port 279H: 00,00, 6A, B5, DA, ED, F6, FB, 7D, BE, DF, 6F, 37, 1B, 0D, 86, C3, 61,B0, 58, 2C 16, 8B, 45, A2, D1, E8, 74, 3A, 9D, CE, E7, 73, 39; and
 (b) setting the ReadDataPort by sending 00 to port 279H and the low order byte of the ReadDataPort address retrieved above shifted right 2 bits to port A79H.

The computer 12 then reads from the next device ID from the ReadDataPort and adds it to the detection list by:
 (a) sending 03H to port 279H and the device number to port A79H to select the device;
 (b) sending 05H to port 279H and reading the ReadDataPort until bit 1 is set (wait for status OK);
 (c) sending 04H to port 279H and reading a byte of the device ID from the ReadDataPort;
 (d) repeating steps (b)–(c) above until all 8 bytes of the device ID are read; and (e) sending 30H to port 279H and 01H to port A79H to activate the device.

The above process is then performed for each device until all of the ISA plug and play devices are enumerated.

Figure 6C:
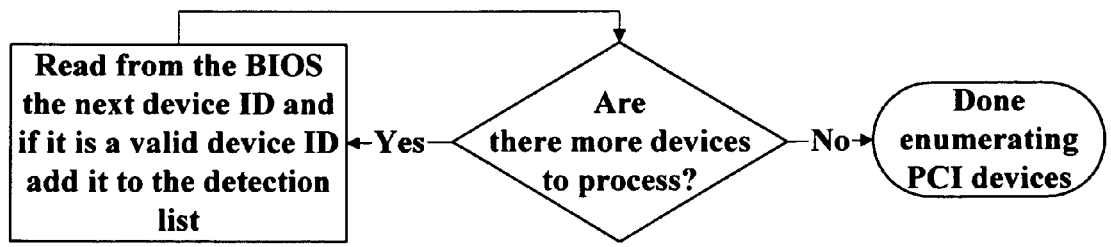

For each PCI device, as shown in FIG. 6C, the computer 12 reads the next device ID from the BIOS and, if it is a valid device ID, adds to the detection list. The computer 12 determines whether a device ID is valid by, for each function 0–7 for each device ID 0–31:
 (a) loading register AX with B109H, register BL with the device ID shifted left 3 bits plus the device function, register BH with 0, and register DI with 0, and then calling interrupt 1AH, whereupon return register CX contains the vendor ID;
 (b) loading register AX with B109H, register BL with the device ID shifter left 3 bits plus the device function, register BH with 0, and register DI with 0, and then calling interrupt 1AH, whereupon the return register CX contains the device ID; and (c) if the vendor ID is not FFFFH and the vendor ID and the device ID are not the same as the last iteration, it is valid.

Figure 6D:
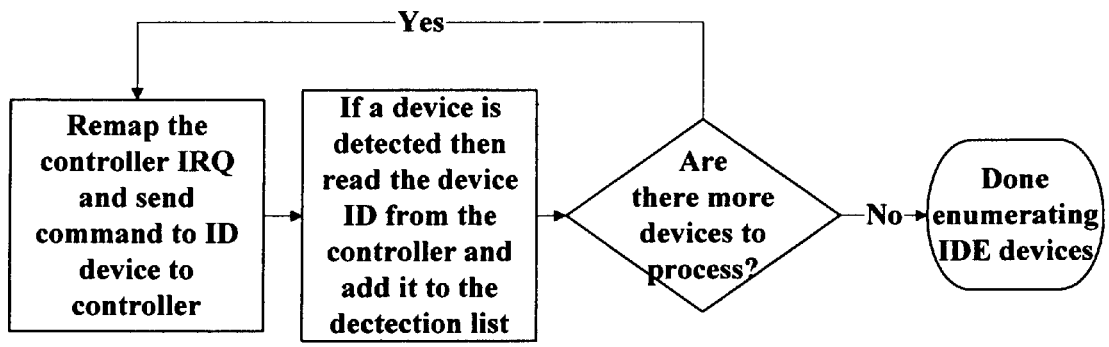

FIG. 6D details the enumeration of IDE devices, such as AT attachment ("ATA") and AT attachment packet interface ("ATAPI") devices. Each IDE device is enumerated by remapping the controller interrupt request ("IRQ") the appropriate command to identify the device to the controller by:

(a) remapping IRQ 14 for primary (15 for secondary) controller to procedure that reads the device ID block from the controller;

(b) sending A0H(master) or B0H(slave) to port 1F6H (176H);

(c) sending ECH(ATA) to port 1F7H(177H); and (d) if not ATA device is detected, then sending 1AH (ATAPI) to port 1F7H(177H).

If a device is detected, computer 12 then reads the device identification from the controller and adds it to the detection list by:

(a) reading from port 1F0(170) 256 byes into the device ID block; and (b) extracting the model from the device ID block(offset 27).

This is done for each IDE device.

Figure 6E:
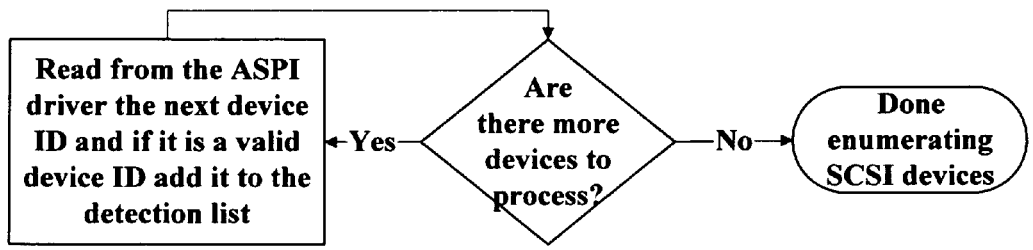

For each SCSI device, as shown in FIG. 6E, computer 12 reads the next device ID from the ASPI driver and, if it is a valid device ID, adds it to the detection list. The SCSI device ID is read by:

(a) opening the ASPI driver (filename is SCSIMGR$);

(b) if the driver is not available, exiting;

(c) otherwise, issuing INT 21 (AX:4402H, BX:ASPI handle, CX:4, DX:offset, DS:segment of pointer for ASPIProc.);

(d) closing the ASPI handle; and (e) for each device ID 0–6, calling ASPIPROC with command 2; ID:the next device ID number, Buffer:the address of the buffer to hold the response; and, if it is a valid response, reading the vendor ID and the device ID from the response buffer.

The enumeration of devices is then complete.

Returning to FIG. 6A, after enumerating the various devices, the computer 12 displays an introduction screen upon enumerating all of the devices associated with the computer 12. The installer is then asked to select an installation option defined in the external configuration file OSI.INI. The installation options may be the same as those presented for the previous embodiment of FIGS. 4A–4C or may be one of several alternatives. Once the installation option is selected, computer 12 displays lists of the detected devices to the installer and installation begins.

Installation begins by executing the selected install option commands in the external configuration file OSI.INI. This creates a temporary directory OSITEMP on the hard drive 20 of the computer 12, transfers an executable file OSIBOOT.EXE and an executable file OSI32.EXE to that directory. Computer 12 next generates an information file OSI.INF from a temporary information file OSITEMP.INF and information in the external configuration file OSI.INI. The computer 12 then generates OSIBOOT.INI from the information in the external configuration file OSI.INI.

Figure 6F:
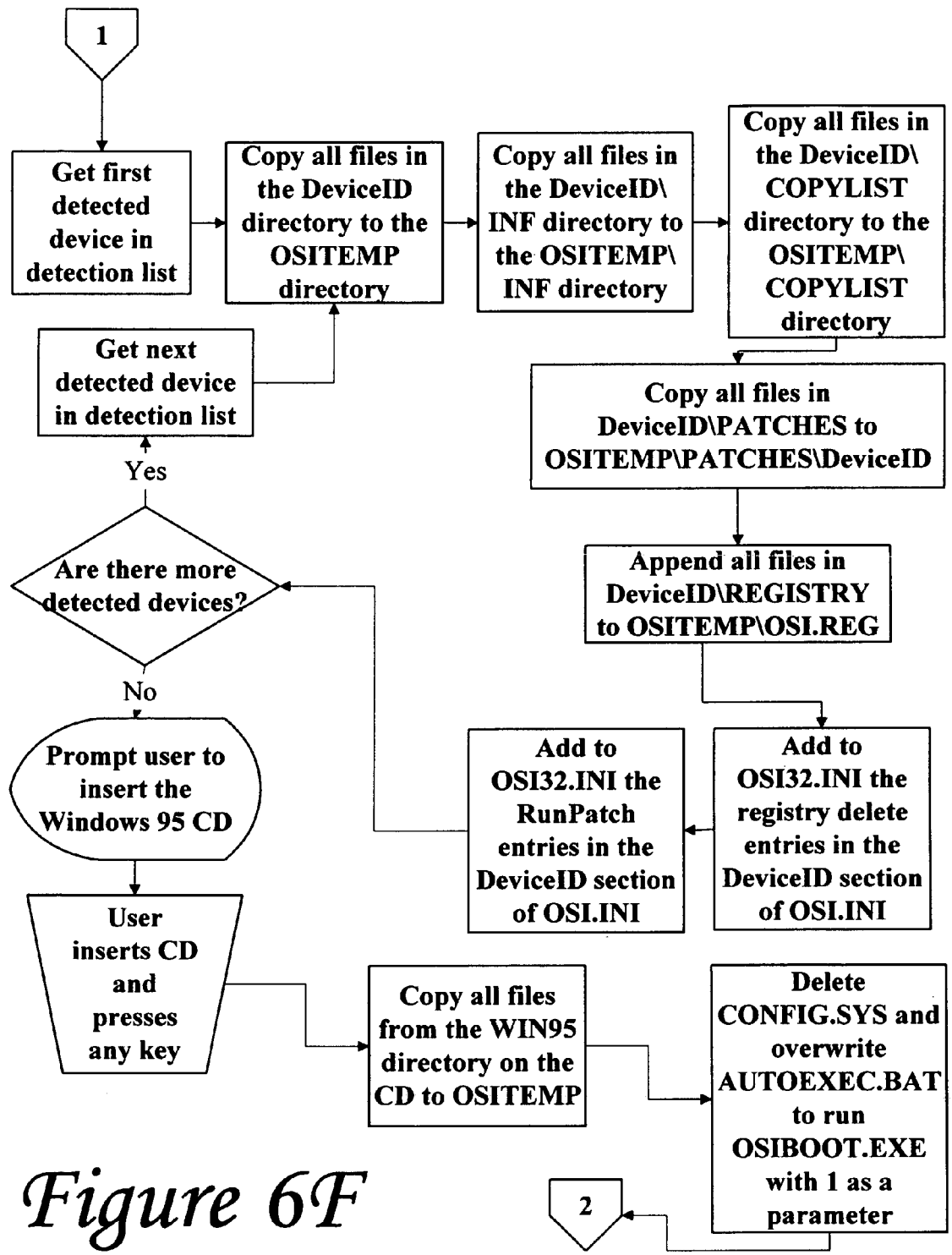
Figure 6G:
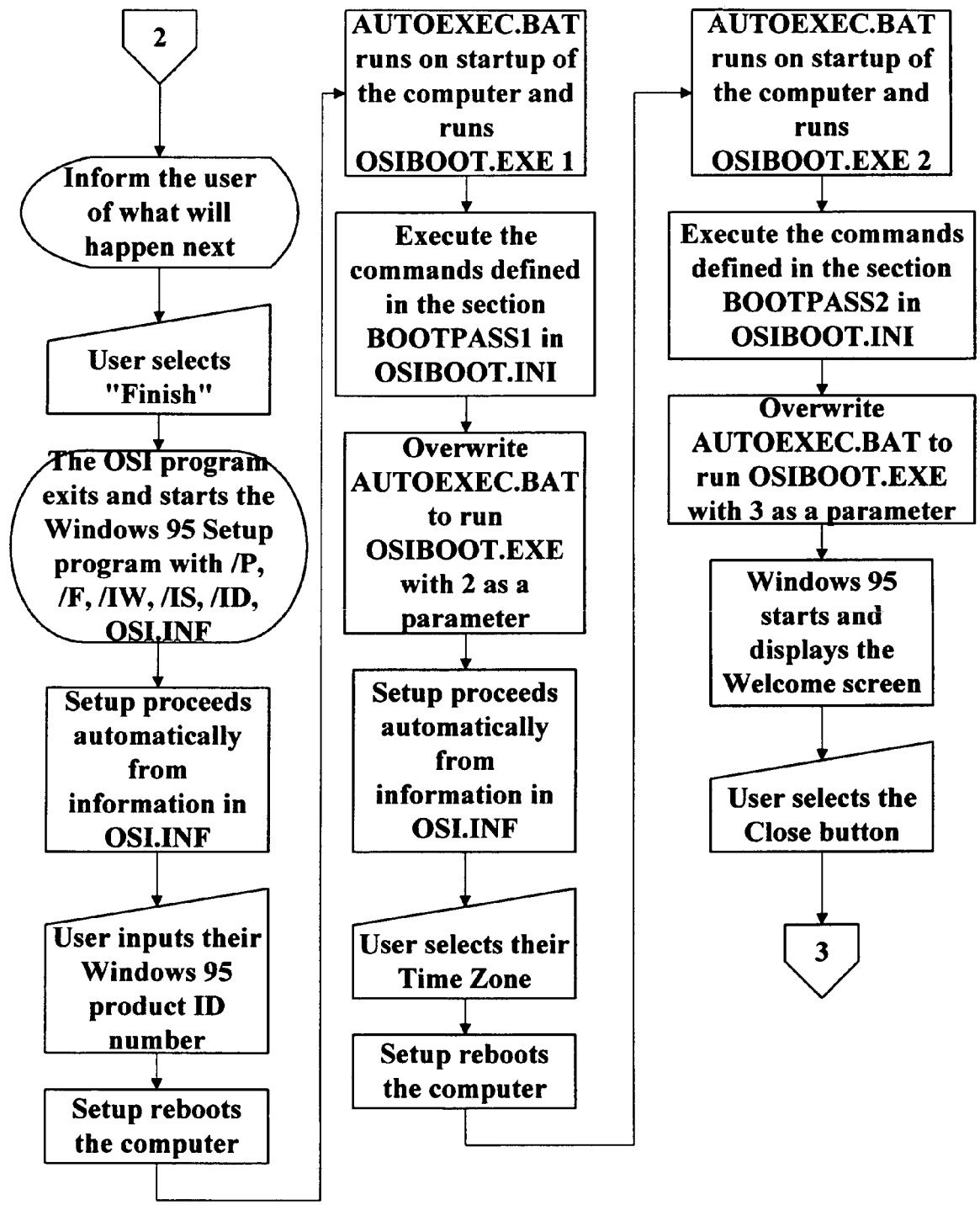
Figure 6H:
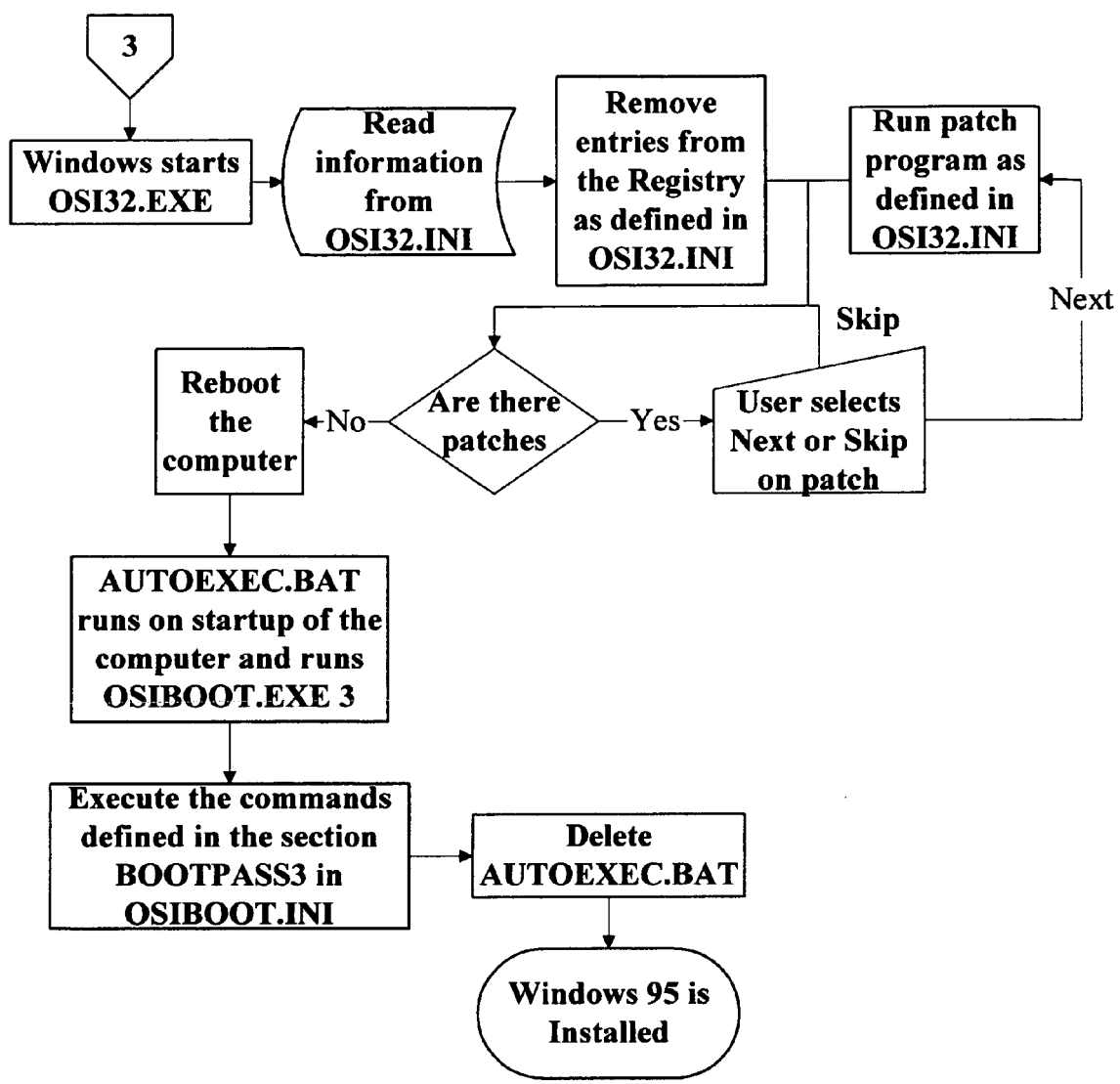

Turning to FIG. 6F, the computer 12 then accesses the detection list and obtains the information regarding the first detected device in the list. The computer 12 then copies a number of files from the C:\WINDOWS\ID subdirectory to the C:\OSITEMP directory. Namely, the computer 12 copies all files in the DeviceID\INF subdirectory to the OSITEMP\INF subdirectory, all files from the device ID\COPYLIST subdirectory to the OSITEMP\COPYLIST directory, from the device ID\PATCHES subdirectory to the OSITEMP\PATCHES\DeviceID subdirectory. The computer 12 then appends all of the files in the device ID\REGISTRY directory to the OSI\TEMP\OSI.REG file, adds the registry delete entries in the device ID section of OSI.INI to the OSI32.INI file, and adds the run patch entries in the device ID section of OSI.INI to the OSI32.INI. This is repeated for each device in the detection list.

Still referring to FIG. 6F, the external installation software then prompts the user to insert the Windows® 95 CD, and then copies all files from the WIN95 directory on the CD to OSITEMP on the hard drive 20. The external software installation then deletes the CONFIG.SYS and overwrites AUTOEXEC.BAT to run OSIBOOT.EXE with one as a parameter. The external installation software program then exists and starts the Windows® 95 setup program using the /P, /F, /IW, /IS, /ID, OSI.INF parameters as shown. These parameters specify that Setup force hardware redetection, bypass the license screen, bypass the ScanDisk function, bypass the disk space check, and obtain the install information from the external configuration file OSI.INF.

The Setup then proceeds automatically from the information in OSI.INF. The user inputs the Windows® 95 product ID number and the setup reboots the computer. Upon reboot, AUTOEXEC.BAT runs on startup of the computer and runs OSIBOOT.EXE with 1 as a parameter, wherein 1 signifies the first pass. The computer 12 then, in accordance with AUTOEXEC.BAT commands, executes the commands defined in the boot pass one section of the OSIBOOT.INI file, which normally copies the INF files. The computer 12 next overwrites AUTOEXEC.BAT to run OSIBOOT.EXE with 2 as a parameter, wherein 2 signifies the second pass. The setup once again proceeds automatically from the information in OSI.INF. The user selects their time zone and setup then reboots the computer. Upon reboot, the AUTOEXEC.BAT file runs OSIBOOT.EXE2. The computer 12 then in accordance with the commands of AUTOEXEC.BAT, executes the commands defined in this section boot pass two and OSIBOOT.INI, which will normally import into the registry of value to run OSI32.EXE. Computer 12 then overwrites AUTOEXEC.BAT to run OSIBOOT.EXE with three as a parameter. Windows® 95 then starts and displays the Windows® screen until the user selects the "close" button. Windows® then executes OSI32.EXE, which reads information from OSI32.INI, removes entries from the registry as defined in OSI32.INI. The computer 12 then determines whether there are any patches to be made and, if so, runs the patch program as defined in OSI32.INI. The computer 12 then reboots the computer. Upon reboot, AUTOEXEC.BAT runs OSIBOOT.EXE3 and executes the commands defined in boot pass three section of OSIBOOT.INI. This will typically import into the registry file OSI.REG. The computer 12 then deletes AUTOEXEC.BAT and Windows®95 is installed.

Remarks

Thus, the acts comprising the methods disclosed above are typically performed by a computer according to instructions encoded in some type of program storage medium. The computer may be a specially programmed, general purpose computer or a particular computer dedicated to a particular task. Also, the instructions may be encoded on any type of computer readable medium acting as a program storage medium. Typical program storage mediums include, but are not limited to: random access memory ("RAM"), such as a floppy diskette, a hard disk, or a magnetic tape; read only memory ("ROM"), such as an optical disk; and variations thereon, such as a write once, read many ("WORM") disk.

It will be therefore appreciated by those of ordinary skill having the benefit of this disclosure that the illustrative embodiments described above are capable of numerous variations without departing from the scope and spirit of the invention. All such variations are considered within the scope of the protected invention. Accordingly, the exclusive rights sought herein are as described in the claims below.

What is claimed is:

1. A method comprising:
providing an operating system package that includes a first configuration file, the operating system package comprising a standalone package to run a computer system without requiring additional software and the first configuration file including information used by the operating system package to install a first driver for a first device on a computer;
providing a second configuration file external to the operating system package, the second configuration file including information to direct the installation of a second driver for a second device;
installing the second driver on the computer based on the information in the second configuration file;
installing the operating system package on the computer based on the information in the second configuration file; and
patching errors in the first configuration file with information in the second configuration file.

2. The method of claim 1, further comprising:
executing a setup program of the operating system package to install the second driver.

3. The method of claim 1, wherein the second device is not the same as the first device.

4. The method of claim 1, further comprising installing applications after the second driver and the operating system are installed.

5. The method of claim 1, further comprising determining one installation procedure from among a plurality of options.

6. The method of claim 1, wherein the second device is identified dynamically.

7. The method of claim 6, wherein the dynamic identification comprises at least one of an automated identification and a user-driven identification.

8. The method of claim 1, wherein the second device is comprises at least one of an ISA, PCI, SCSI, and an IDE device.

9. The method of claim 1, wherein the second device is comprises at least one of a display device, a sound device, a modem, and a controller.

10. An article comprising at least one computer readable storage medium storing instructions to cause a computer to:
generate an external configuration file that is external to an operating system package, the operating system package comprising a standalone package to run a computer system without requiring additional software and the external configuration file including information to direct the installation of a driver for a particular device and the operating system package including an internal configuration file used by the operating system package to install at least one other driver for at least one other device on the computer;
install the driver for the particular device of the computer based on the information in the external configuration ion file;
install the operating system package on the computer based on the information in the external configuration file; and
patch errors in the internal configuration file with information in the external configuration file.

11. The article of claim 10, wherein said at least one storage medium stores instructions to cause the computer to install applications after the particular driver and the operating system package are installed.

12. The article of claim 10, wherein said at least one storage medium stores instructions to cause the computer to determine one installation procedure from among a plurality of options.

13. The article of claim 10, wherein said at least one storage medium stores instructions to cause the computer to dynamically identify the particular device.

14. The article of claim 10, wherein the particular device is comprises at least one of an ISA, PCI, SCSI, and an IDE device.

15. The article of claim 10, wherein the particular device is comprises at least one of a display device, a sound device, a modem, and a controller.

16. The article of claim 10, wherein said at least one storage medium stores instructions to cause the computer to install the driver for the second device and the operating system package contemporaneously.

* * * * *

UNITED STATES PATENT AND TRADEMARK OFFICE
CERTIFICATE OF CORRECTION

PATENT NO. : 6,934,956 B1 Page 1 of 1
DATED : August 23, 2005
INVENTOR(S) : Duane Le Allen It is certified that error appears in the above-identified patent and that said Letters Patent is hereby corrected as shown below:

Column 12,
Lines 4, 41 and 44 "is" should be deleted.

Signed and Sealed this

First Day of November, 2005

JON W. DUDAS
*Director of the United States Patent and Trademark Office*